United States Patent Office 3,829,508
Patented Aug. 13, 1974

3,829,508
HALOGENOALKYL-POLYGLYCOL ETHERS AND PROCESS FOR PREPARING THEM
Helmut Diery, Kelkheim, Taunus, and Lorenz Heiss, Hofheim, Taunus, Germany (both c/o Farbwerke Hoechst AG, Frankfurt am Main, Germany)
No Drawing. Continuation of abandoned application Ser. No. 841,620, July 14, 1969. This application Mar. 30, 1972, Ser. No. 239,822
Int. Cl. C07c *43/00, 43/12*
U.S. Cl. 260—615 B      3 Claims

ABSTRACT OF THE DISCLOSURE

Compounds of the general formula $$R_1-CHCH_2CH_2-O(C_nH_{2n}O)_m-R_2$$
$$\phantom{R_1-C}|$$
$$\phantom{R_1-C}X$$

wherein $R_1$ stands for alkyl containing 4 to 20 carbon atoms, X stands for chlorine or bromine, $R_2$ stands for alkyl containing 1 to 20 carbon atoms, a radical of an alkane-carboxylic acid containing 1 to 18 carbon atoms, the phenyl radical, the naphthyl radical or an alkyl-phenyl radical containing 1 to 12 aliphatic carbon atoms, the benzoyl or benzyl radical or the radical $$R_1CHCH_2CH_2-$$
$$\phantom{R_1C}|$$
$$\phantom{R_1C}X$$

$n$ stands for an integer from 2 to 4 and $m$ stands for an integer from 2 to 200, which are useful as tensides and emulsifiers, and a process for preparing them by reacting a halogeno-methyl ether of the formula $$R_3O(C_nH_{2n}O)_m-CH_2X$$

in which X, $n$ and $m$ have the meanings given above, and $R_3$ stands for the radical $-CH_2Cl$ or $-CH_2Br$ or has the same meaning as $R_2$, in the presence of a Friedel-Crafts catalyst, at 10 to 100° C., with an α-olefin containing 8 to 20 carbon atoms.

---

This is a continuation of application Ser. No. 841,620 filed July 14, 1969 and now abandoned. The present invention relates to novel halogenoalkyl-polyglycol ethers and to a process for preparing them.

More particularly, the present invention provides halogenoalkyl-polyglycol ethers of the general formula $$R_1-CHCH_2CH_2-O(C_nH_{2n}O)_m-R_2 \quad (I)$$
$$\phantom{R_1-C}|$$
$$\phantom{R_1-C}X$$

wherein $R_1$ stands for alkyl containing about 4 to 20, preferably 8 to 20, carbon atoms, X stands for chlorine or bromine, $R_2$ stands for alkyl containing 1 to 20 carbon atoms, a radical of an alkane-carboxylic acid containing 1 to 18 carbon atoms, the phenyl radical, the naphthyl radical or an alkyl-phenyl radical the aliphatic radicals of which may contain 1 to 12 carbon atoms, the benzoyl or benzyl radical or the radical $$R_1-CHCH_2CH_2-$$
$$\phantom{R_1-C}|$$
$$\phantom{R_1-C}X$$

$n$ stands for an integer from 2 to 4 and $m$ stands for an integer from 2 to 200, preferably 6 to 100.

Furthermore, the present invention provides a process for preparing the halogenoalkyl-polyglycol ethers of the above formula, wherein an α-olefin having a chain length of about 8 to 20 carbon atoms is reacted in the presence of Friedel-Crafts catalysts with mono- or bis-chloro- or -bromomethyl ethers of a polyalkylene oxide. In the case of a reaction of a bis-chloromethyl polyalkylene oxide with an α-olefin, wherein symmetrical products are formed, the reaction may be illustrated by the following formula scheme:

$$2R_1-CH=CH_2 + ClCH_2O(C_nH_{2n})_mCH_2Cl \longrightarrow$$
$$R_1-CH-CH_2CH_2O(C_nH_{2n}O)_mCH_2CH_2-CH-R_1$$
$$\phantom{R_1-CH}|\phantom{-CH_2CH_2O(C_nH_{2n}O)_mCH_2CH_2-CH}|$$
$$\phantom{R_1-CH}Cl\phantom{-CH_2CH_2O(C_nH_{2n}O)_mCH_2CH_2-CH}Cl$$

In the above formulae, $R_1$, $m$ and $n$ have the meanings given above.

For preparing asymmetrical halogenoalkyl-polyglycol ethers of the formula I, the process is started from monochloro- or monobromo-methyl ethers of polyalkylene oxide compounds whose free polyglycol radical is substituted by an alkyl, carboxyalkyl, phenyl or alkylphenyl radical. In this case, the reaction is effected with 1 mol of α-olefin. The substituents of the monohalogeno-methyl ethers of the polyglycols may be, for example methyl, butyl, dodecyl, octadecyl, phenyl, butyl-phenyl, nonylphenyl, dodecyl-phenyl, benzyl, acetyl or stearoyl radicals.

The chloro- or bromo-methylated polyalkylene oxides used as the starting substances may be prepared in the most simple case according to known methods by the reaction of the polyalkylene oxide compounds with formaldehyde and hydrochloric acid (Chemical Review 55 (1955), pages 301 et seq.). A preferred method for preparing these starting substances consists in reacting the polyalkylene glycols with para-formaldehyde and thionyl chloride or bromide. For this purpose, for example for preparing bis-chloromethyl ethers, a mixture of 1 mol of polyalkylene glycol with about 2 mols of p-formaldehyde is combined slowly, while stirring, with about 2 mols of thionyl chloride. During this time, the temperature of the reaction mixture is kept at about 0 to 50° C. by cooling. When the reaction is completed, the whole is suitably stirred for some time in order to remove the sulfur dioxide formed, or the sulfur dioxide is removed by distillation under reduced pressure. In this process, excess quantities of paraformaldehyde or thionyl chloride do not disturb the reaction. For preparing monohalogenomethyl ethers of polyalkylene glycols which are substituted at one side, suitably about 1 mol of para-formaldehyde and 1 mol of thionyl chloride are used per mol of these polyglycol ethers substituted at one side. In this method, the halogenomethyl compounds are obtained directly in water-free form.

As polyalkylene oxide compounds which may be used in the form of their chloro- or bromo-methyl ethers as starting substances for the addition reaction of the present invention, there may be mentioned, for example, diethylene glycol, polyethylene oxides having molecular weights of up to about 10,000, preferably up to about 5000, as well as the monoalkyl ethers of these polyethylene oxides, for example, polyethylene oxide monomethyl ether, monobutyl ether, monododecyl ether, monooctadecyl ether, monobutyl-phenyl ether, monooctyl-phenyl ether, monononyl-phenyl ether, monobenzyl ether, and the esters, for example polyethylene oxide mono-acetate or mono-stearate. In the same manner, there may be used compounds of the series of the poly-1,2-propylene oxides and poly-1,2- or 2,3-butylene oxides, for example poly-1,2-propylene oxide-monoethyl ether, -monodecyl ether, -monooctadecyl ether, -monobutyl-phenyl ether, -mononyl-phenyl ether, -monobenzoate, -monostearate or poly-1,2-butylene oxide-monooctyl ether and similar compounds.

As α-olefins which may be used according to the invention, there may be mentioned, for example octene-1, decene-1, octadecene-1, dodecene-1, eicosene-1, as well as mixtures of these olefins.

The addition reaction according to the present invention is carried out by mixing both components, i.e. the α-olefins and the mono- or bis-halogenomethyl-polyalkylene oxide compounds, in about the theoretically required amount and the catalyst. During this process, the temperature of the reaction mixture is kept preferably in the range of from about 10 to 100° C. As catalysts, there may be used the known Friedel-Crafts catalysts, for example zinc chloride, tin tetrachloride, aluminium chloride, iron-III chloride. The catalysts are used in the usual amounts. In general, about 1 to 10%, referred to the weight of the halogenomethyl ethers are used.

The novel halogenoalkyl-polyglycol ethers have surface active properties, provided they contain a sufficiently long polyalkylene oxide chain which promotes solubility in water, and may be used as detergents, wetting agents and emulsifiers. The ratio of hydrophobic to hydrophilic radicals of the novel compounds can be adjusted by the length of the polyethylene oxide chain on the one hand and by the length of the alkyl chains of the α-olefin used on the other hand, to the intended special use. Compounds which contain in the molecule a polypropylene oxide radical or a polybutylene oxide radical have oleophilic properties and may be used, for example, as additives to mineral oil.

The following Examples illustrate the invention but they are not intended to limit it thereto:

EXAMPLE 1

160 g. of dodecene-1 were added to 350 g. of the bis-chloromethyl ether of a polyethylene glycol having a mean molecular weight of 600, and 30 g. of pulverized zinc chloride were introduced into the mixture. The mixture was stirred intensely for 20 hours at 40° C., the zinc chloride dissolving after about 3 to 4 hours. The reaction product was freed from zinc chloride by washing with warm saturated NaCl-solution. The reaction product, which was a both-sided addition compound of the polyethylene glycol used, constituted a yellow oil which dissolved clearly in water. The product was found to contain 6.4% by weight of organically bound chlorine. The yield was 460 g.

In the same manner, dodecene-1 was fixed on both sides to the bis-chloromethyl ethers of polyethylene glycols having average molecular weights of 200, 400, 1000, 1500 and 2000. In these reactions, an industrial mixture of α-olefins containing 15 to 20 carbon atoms could be used instead of dodecene-1.

EXAMPLE 2

15 g. of pulverized zinc chloride were added, while stirring, to a mixture of 170 g. of the chloromethyl ether of a methoxy-polyethylene glycol having an average content of 6 ethoxyl groups, and 82 g. of dodecene-1, and the mixture was stirred for 30 hours at 30 to 50° C. The reaction mixture was then washed several times with warm NaCl-solution and dried. 212 g. of a clearly water-soluble product having a content of 6.8% by weight of organically bound chlorine were obtained.

In the same method, an industrial mixture of α-olefins containing 15 to 20 carbon atoms could be used instead of dodecene-1. Likewise, there could be used a methoxy-polyethylene glycol containing 4, 12 or 25 ethoxyl groups instead of the methoxy-polyethylene glycol containing 6 ethoxyl groups.

EXAMPLE 3

200 g. of a polypropylene glycol having a mean molecular weight of 2000 were mixed with 6.6 g. of para-formaldehyde. At 40° C., 26.1 g. of thionyl chloride were added dropwise and the mixture was stirred for 1 hour at 40° C. The mixture was then treated for 2 hours at 40° C. under reduced pressure. The bis-chloromethyl ether of the polypropylene glycol used was so obtained; it was combined with 40 g. of a mixture of α-olefins containing 15 to 18 carbon atoms (molecular weight 226) and to the whole, 10 g. of tin tetrachloride were added dropwise. The mixture was then stirred for 20 hours at 40° C. and the tin tetrachloride was removed from the reaction mixture by washing with saturated NaCl-solution.

The addition compound was obtained in a yield of 226 g. in the form of an oily product. The product was found to contain 2.8% by weight of organically bound chlorine which, in contradistinction to the chlorine of the bis-chloromethyl ether used, is not saponified by aqueous lyes.

EXAMPLE 4

120 g. of thionyl chloride were added dropwise, at 10 to 30° C., to a mixture of 620 g. of dodecyl-polyglycol ether containing on the average 10 ethoxyl groups, and 31 g. of paraformaldehyde. The whole was then stirred for 1 hour and evacuated in a water-jet vacuum. The dodecyl-polyglycol chloromethyl ether obtained in this manner in quantitative yield was combined with 150 g. of dodecene-1 and then with 20 g. of tin tetrachloride. The reaction mixture was stirred for 10 hours at 40 to 50° C. The reaction product was washed with a NaCl-solution until it was free from chlorine ions and the unreacted dodecene-1 was then removed by distillation under reduced pressure at $10^{-1}$ torr.

770 g. of the addition product of the chloromethyl ether to dodecene-1 were obtained. The product was found to contain 4.1% by weight of organically bound unsaponifiable chlorine.

The addition of dodecene-1 to the chloromethyl ether of nonyl-phenol polyglycol containing on the average 30 ethoxyl groups could be effected according to the same method.

EXAMPLE 5

25 g. of aluminium chloride were introduced into a mixture of 146 g. of bis-bromomethyl ether of diethylene glycol and a solution of 82 g. of hexene-1 in 150 ml. of methylene chloride. The reaction mixture was stirred for 12 hours at 20 to 30° C. and the reaction product was then washed several times with a saturated NaCl-solution. The methylene chloride was then removed by distillation. The symmetrical addition product was obtained in a yield of more than 90% by weight. It was found to contain 34% by weight of bromine.

EXAMPLE 6

417 g. of the bis-chloromethyl ether of a polybutylene oxide having a molecular weight of 720 were intimately mixed with 278 g. of eicosene-1 and 40 g. of iron-III chloride. The mixture was then stirred for 20 hours at 60 to 70° C. The reaction product was washed with a saturated NaCl-solution. The symmetrical addition product was obtained in a yield of 87% by weight and was found to contain 5.0% by weight of organically bound unsaponifiable chlorine.

EXAMPLE 7

98 g. of the chloromethyl ether of a reaction product of 1 mol of stearyl alcohol and 15 mols of ethylene oxide were well mixed, while stirring, at 50 to 60° C., with 16 g. of dodecene-1 and 5 g. of zinc chloride and the mixture was further stirred for 15 hours at this temperature. The reaction product so obtained was dissolved in benzene and washed several times with a saturated NaCl-solution. After removal of the solvent by distillation, there was obtained the water-soluble addition product of the chloromethyl ether with dodecene-1 in an almost quantitative yield.

EXAMPLE 8

66 g. of the chloromethyl ether of a reaction product of 1 mol of stearic acid and 12 mols of ethylene oxide were combined, while stirring, at 40° C., with 8 g. of hexene-1 and 5 g. of zinc chloride and the whole was further stirred for 10 hours. The reaction product was dissolved in benzene and washed several times with saturated NaCl-solution in order to remove the zinc chloride. The solvent was then eliminated on a rotatory evaporator.

The addition product was obtained in a yield of 67.0 g. (90% of the theory). It was found to contain 4.6% by weight of organically bound chlorine.

EXAMPLE 9

In a round flask having a capacity of 1 liter and provided with stirrer and water-cooling, 250 g. of polyethylene glycol having a molecular weight of 1000 were molten at 50 to 60° C. under exclusion of moisture and then, 16 g. of p-formaldehyde were added while stirring. 66 g. of thionyl chloride were added dropwise at 45 to 50° C., while cooling, and for completing the reaction, the whole was stirred for 2 hours and for further 2 hours under reduced pressure. To the bis-chloromethyl-polyglycol ether formed that had a chlorine content of 6% (in bound form), there were added, while stirring, 102 g. of $\alpha$-olefin-blend $C_{15}$-$C_{18}$ and 30 g. of zinc chloride.

The reaction mixture was then stirred thoroughly for about 20 hours at 50–55° C., then heated to 70° C. and, at this temperature, it was combined with 350 ml. of water and 100 g. of NaCl. Heating was continued to 85 to 90° C. and then, 20 g. of isopropanol were added.

After having stirred the mixture for one hour at 90° C., phase separation was carried out. The upper phase was washed several times at 90° C. with a saturated NaCl-solution, dissolved in benzene and dried with sodium sulfate. After removal of the benzene, a soon solidifying wax remained behind which dissolved clearly in water. Yield: 360 g.; turbidity point: 68° C.

The content of bound chlorine of 4.5% corresponds with the constitution

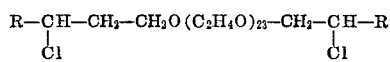

$R = C_{13}$-$C_{16}$.

This product as well as in particular products of the formula

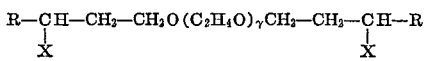

wherein R represents an alkyl radical containing 14 to 20 carbon atoms, X represents chlorine or bromine, $\gamma$ stands for an integer from 12 to 30, have particularly advantageous properties when used as an emulsifier in the manufacture of, for example, montan wax emulsions and drilling and cutting emulsions based on mineral oil and chloroparaffins.

We claim:

1. Bis-haloalkyl ethers of the formula

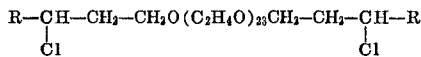

wherein R is a mixture of alkyl groups of 13 to 16 carbon atoms.

2. Bis-haloalkyl ethers of the formula

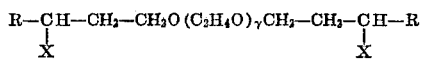

wherein R represents an alkyl radical of 14 to 20 carbon atoms or mixtures thereof, X is chlorine or bromine, and $\gamma$ is 12 to 30.

3. Haloalkyl polyglycol ether compounds of the general fomula

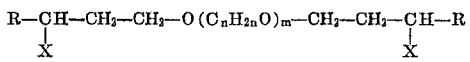

wherein R is an alkyl group of 8 to 20 carbon atoms or mixtures thereof, X is chlorine or bromine, n is 2 to 4 and m is 2 to 200.

References Cited

UNITED STATES PATENTS

| | | | |
|---|---|---|---|
| 2,024,749 | 12/1935 | Scott | 260—614 A UX |
| 2,075,312 | 3/1937 | Straus | 260—614 R X |
| 2,143,021 | 1/1939 | Martin | 260—614 R X |
| 2,533,053 | 12/1950 | Schaerling | 260—658 R |
| 3,240,816 | 3/1966 | Hurwitz et al. | 260—614 R X |

HOWARD T. MARS, Primary Examiner

U.S. Cl. X.R.

252—52 A, 54, 54.6, 89, 171, 351, 352; 260—473 R, 484 A, 611 B, 613 B

UNITED STATES PATENT OFFICE
CERTIFICATE OF CORRECTION

Patent No. 3,829,508        Dated August 21, 1974

Inventor(s) Helmut Diery

It is certified that error appears in the above-identified patent and that said Letters Patent are hereby corrected as shown below:

In the Heading:

After "Main, Germany)" insert -- assignors to Farbwerke Hoechst Aktiengesellschaft vormals Meister Lucius & Bruning, Frankfurt am Main, Germany, a corporation of Germany -- and

After "Serial No. 239,822" insert -- claims Priority, application, Switzerland, July 16, 1968, 10,622. --

Signed and sealed this 29th day of October 1974.

(SEAL)
Attest:

McCOY M. GIBSON JR.
Attesting Officer

C. MARSHALL DANN
Commissioner of Patents